United States Patent
Schibsbye

(10) Patent No.: US 9,486,967 B2
(45) Date of Patent: Nov. 8, 2016

(54) FACILITY AND METHOD FOR MANUFACTURING A ROTOR BLADE OF A WIND TURBINE AND METHOD FOR SETTING UP THE FACILITY

(75) Inventor: Karsten Schibsbye, Fredericia (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 555 days.

(21) Appl. No.: 14/006,758

(22) PCT Filed: Jun. 16, 2011

(86) PCT No.: PCT/EP2011/059992
§ 371 (c)(1),
(2), (4) Date: Nov. 6, 2013

(87) PCT Pub. No.: WO2012/130339
PCT Pub. Date: Oct. 4, 2012

(65) Prior Publication Data
US 2014/0054811 A1    Feb. 27, 2014

(30) Foreign Application Priority Data

Mar. 25, 2011 (EP) ..................................... 11159782

(51) Int. Cl.
| | | |
|---|---|---|
| B29C 70/48 | (2006.01) | |
| B29C 70/54 | (2006.01) | |
| B29C 31/04 | (2006.01) | |
| B29C 31/10 | (2006.01) | |
| B29C 37/00 | (2006.01) | |
| F03D 1/06 | (2006.01) | |

(52) U.S. Cl.
CPC .............. *B29C 70/48* (2013.01); *B29C 31/04* (2013.01); *B29C 31/10* (2013.01); *B29C 37/006* (2013.01); *B29C 70/546* (2013.01); *F03D 1/0675* (2013.01); *Y02E 10/721* (2013.01); *Y02P 70/523* (2015.11)

(58) Field of Classification Search
None
See application file for complete search history.

(56) References Cited

U.S. PATENT DOCUMENTS

| | | | |
|---|---|---|---|
| 5,236,321 A | 8/1993 | Newton | |
| 6,149,844 A | 11/2000 | Graham | |
| 6,877,933 B2* | 4/2005 | Ho | B29C 31/02 406/152 |
| 7,972,087 B2* | 7/2011 | Davison | A22C 21/0053 222/410 |
| 8,834,949 B2* | 9/2014 | De Bortoli | B65B 3/32 131/369 |
| 2007/0251090 A1 | 11/2007 | Breugel et al. | |
| 2009/0250847 A1* | 10/2009 | Burchardt | B29C 33/0061 264/511 |
| 2011/0221093 A1* | 9/2011 | Perrow | B29C 70/44 264/255 |
| 2012/0114497 A1* | 5/2012 | Petersen | F03D 1/0675 416/241 R |

FOREIGN PATENT DOCUMENTS

| | | |
|---|---|---|
| CN | 101003179 A | 7/2007 |
| DE | 2443726 A1 | 3/1976 |
| EP | 1310351 A1 | 5/2003 |
| EP | 1707804 A1 | 10/2006 |
| EP | 2116359 A1 | 11/2009 |
| WO | WO 2011000381 A2 | 1/2011 |

\* cited by examiner

*Primary Examiner* — Benjamin Schiffman

(57) ABSTRACT

A facility for manufacturing a rotor blade of a wind turbine is provided. The facility includes an injection machine for injecting an injection material into a mold to form the rotor blade, a movable tank system for accommodating precursor material to be supplied to the injection machine for preparing the injection material, wherein the movable tank system has wheels for moving the tank system. Further, a method for setting up a facility and a method for manufacturing a rotor blade are described.

17 Claims, 1 Drawing Sheet

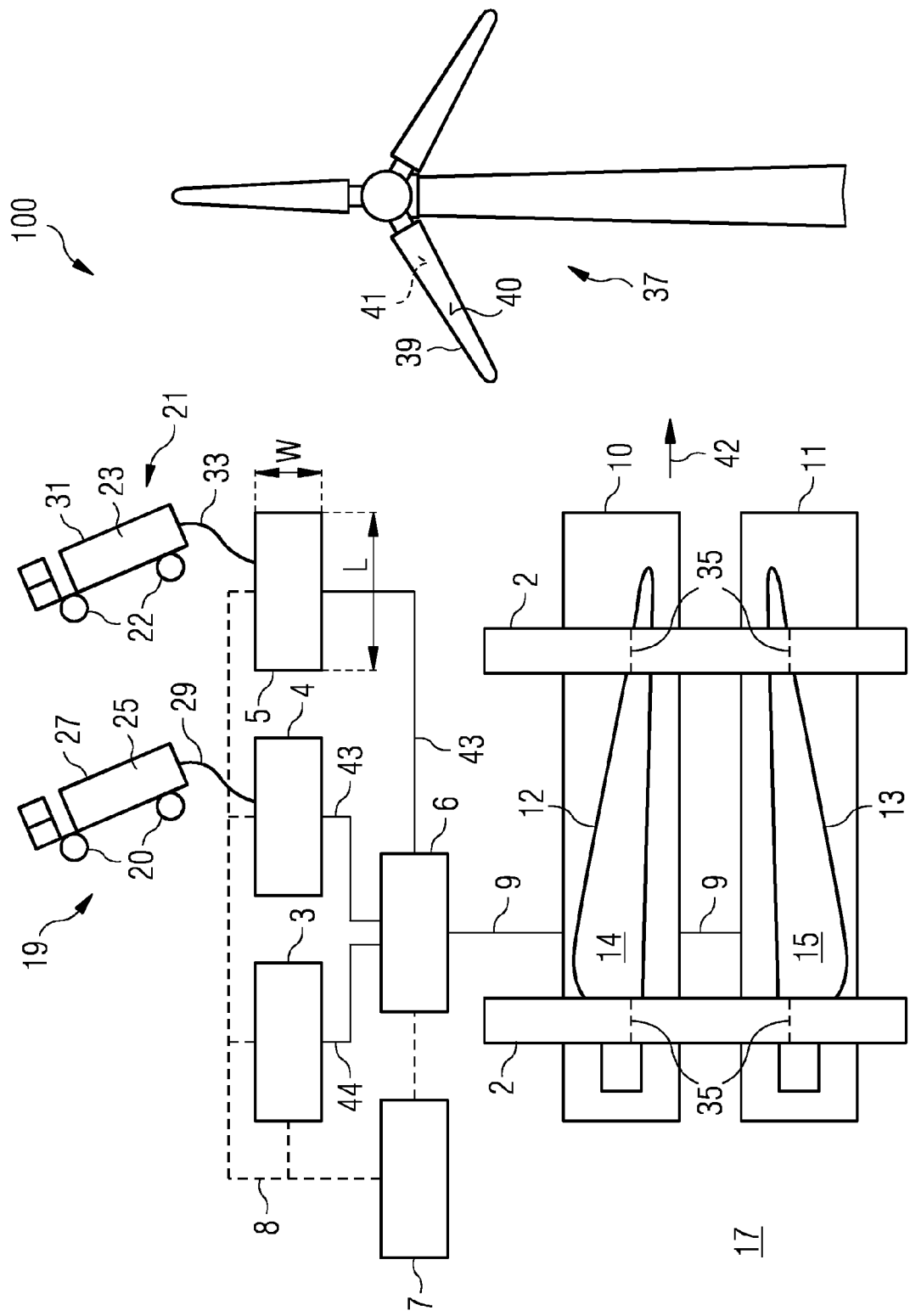

FACILITY AND METHOD FOR MANUFACTURING A ROTOR BLADE OF A WIND TURBINE AND METHOD FOR SETTING UP THE FACILITY

CROSS REFERENCE TO RELATED APPLICATIONS

This application is the US National Stage of International Application No. PCT/EP2011/059992 filed Jun. 16, 2011 and claims benefit thereof, the entire content of which is hereby incorporated herein by reference. The International Application claims priority to the European Patent Office application No. 11159782.9 EP filed Mar. 25, 2011, the entire contents of which is hereby incorporated herein by reference.

FIELD OF INVENTION

The present invention relates to a facility and to a method for manufacturing a rotor blade of a wind turbine and to a method for setting up a manufacturing facility at a facility site which is in particular close to an installation site of the wind turbine to which the rotor blade is to be mounted.

ART BACKGROUND

Wind turbines are nowadays installed at various remote sites onshore or offshore. This requires that components of the wind turbine need to be transported to the final installation site of the wind turbine. Since wind turbines have grown in size considerably involving that also the components from which the wind turbines are assembled have grown in size, transporting of the components to the final installation site may be difficult. In particular, a rotor blade of a wind turbine may have a length between 30 m and 60 m, in particular around 40 m, which may make transporting the rotor blade to the installation site difficult.

Various ways of bypassing the transportation problem have been suggested in the prior art. One way may be to section the blades so that the blade is separated into two parts with for example two 20 m long halves and to transport the two halves to the final installation site. At the installation site the two halves have to be assembled or connected to each other. However, this solution may have the major disadvantage that the solution induces a weak joint where the halves are connected upon assembly of the rotor blade.

EP 1 707 805 A discloses that various parts of the blade are manufactured at various geographically separated manufacturing facilities. Thereby, a lot of transportation activity is required to transport the various blade parts including also long parts, such as beam/web parts of the blade to the installation site of the wind turbine.

There may be a need for a facility and for a method for manufacturing a rotor blade of a wind turbine and a need for a method for setting up a facility, wherein at least some of the above-mentioned problems are reduced.

SUMMARY OF THE INVENTION

This need may be met by the subject matter according to the independent claims. Advantageous embodiments of the present invention are described by the dependent claims.

According to an embodiment of the present invention, a facility (in particular an arrangement or a factory which may be assembled from plural components each of which may be transported in a convenient way using a conventional container and/or transportation means, such as a truck or a train) for manufacturing (in particular forming, casting, producing using injection moulding) a rotor blade (a physical structure providing an airfoil for forming a suction side and a pressure side upon impact of wind, thereby converting wind energy to kinetic energy, in particular rotational energy, of the rotor blade, wherein the rotor blade may be connected to a rotor shaft of the wind turbine, the rotor shaft being mechanically connected to a generator for converting the rotational energy transferred from the rotor blade to the rotor shaft to electric energy to be supplied to a utility grid) of a wind turbine (in particular comprising a wind turbine tower, a nacelle mounted on top of the wind turbine tower, a rotor shaft rotatably supported within the nacelle for rotating upon moving of the rotor blade which is caused by the impact of the wind) is provided. Thereby, the facility comprises a injection machine (in particular adapted to perform an injection moulding process, wherein the injection machine in particular comprises a barrel for filling in injection material, wherein in particular a reciprocating screw or some other supply mechanism is arranged within the barrel, wherein in particular the injection material is moved upon rotation of the reciprocating screw to be provided or supplied to a mould, wherein the injection material may in particular be a thermosetting material which is mixed with a cross-linking material for cross-linking the molecules comprised within the thermosetting material with each other, in particular upon application of heat for initiating the cross-linking process or reaction and keeping the injection material for a particular curing time or hardening time or cross-linking time within the mould) for injecting (in particular supplying the injection material upon application of a pressure into the mould, in particular using the reciprocating screw for supplying the injection material into the mould) an injection material (in particular a material which has been formed by mixing a thermosetting material with a cross-linking material, wherein in particular the injection material may be fluid or liquid, in particular a resin material in particular a thermosetting polymer material mixed with a cross-linking agent) into a mould (in particular a casting mould providing a cavity being limited or being delimited by an inner surface having a shape complementary to an outer surface of the rotor blade to be manufactured, wherein in particular the mould may be made of a metal, such as steel) to form the rotor blade (in particular upon cross-linking or curing the injection material which has been injected into the mould). Further the facility comprises a movable (in particular mobile or semi-mobile) tank system (in particular comprising a container for accommodating the precursor material and further comprising at least two wheels which may be used to move the movable tank system, the tank system in particular comprising at least one truck having at least four wheels) for accommodating (or storing or containing) precursor material (which may in particular either be a thermosetting material without a cross-linking material or which may be the cross-linking material) to be supplied to the injection machine (wherein in particular between the movable tank system and the injection machine a pipe or a pipe system may be arranged for transferring the precursor material to the injection machine, wherein between the movable tank system and the injection machine in particular also a supply actuator, such as a screw, a piston or the like may be arranged to cause the precursor material to flow from the movable tank system to the injection machine) for preparing the injection material (in particular upon mixing a thermosetting material with a cross-linking material), wherein the movable tank system has wheels (in particular two wheels, four wheels, six wheels, eight wheels or even more wheels) for moving (in particular rolling upon rotation of the wheels) the tank system.

In particular, the manufacturing facility may be easily set up at a desired facility side which may be close to a final installation site of the wind turbine to which the manufactured rotor blade is finally to be connected. Thereby, it may not be necessary to transport a voluminous or long rotor blade over long distances, such as between 10 km and 1000 km. Instead, the rotor blade may be manufactured very close (such as between 5 m and 10000 m) to the installation site of the wind turbine. In particular the facility may be located within a radius of 5 m to 10000 m, in particular 10 m and 500 m, from the wind turbine to which the rotor blade is to be connected. Thus, the manufactured rotor blade may be needed to be transported across a relatively short distance to reach its final destination.

For enabling fast and simple setting up of the manufacturing facility the movable tank system is especially advantageous, as repeated supply of precursor material may be needed to manufacture one or more rotor blades. In particular, the manufacturing facility after being set up at the facility site close to the installation site of the wind turbine may be utilized for manufacturing a number of rotor blades (such as 2, 3, 4, 5 to 10, or 10 to 100) rotor blades to be connected to wind turbines which are still close to the facility site. Thereby, a transportation problem of the rotor blade(s) may be addressed and reduced.

In particular, the manufacturing facility (also referred to as production facility for producing wind turbine blades) may comprise several components which may be separately packed and transported to the facility site. In particular, the components from which the manufacturing facility may be assembled may each fit into standard containers to be easily transported using for example a truck or a train. In particular, the manufacturing facility may be assembled and/or de-assembled from the plural components or modules in a simple and fast manner and may be set up at another facility site in a time period between 1 hour and 50 hours, in particular between 1 hour and 10 hours.

Although the mould may be a voluminous or elongated structure (in particular being between 20 m and 60 m long corresponding to a length of the rotor blade to be manufactured) the mould need to be transported to the facility site only once but allows to manufacture a large number of rotor blades as explained above. Thus, only one cumbersome transportation has to be performed for actually providing or producing a large number of rotor blades close to installation sites of the corresponding wind turbines.

According to an embodiment of the present invention, the manufacturing factory further comprises a releasable pipe (or pipe system, in particular comprising a tubular pipe, such as a flexible pipe having standard connectors at the two ends of the pipe) for releasably (enabling attaching and detaching the releasable pipe to/from the injection machine (or any intermediate units) on one hand and to/from the movable tank system on the other hand) interconnecting (for allowing flow of the precursor material through the releasable pipe from the movable tank system to the injection machine) the tank system with the injection machine for guiding (or leading or transferring) the precursor material from the tank system to the injection machine.

In particular, the releasable pipe or releasable pipe system may comprise one, two or more pipe sections which may be connected to different portions of the tank system, in particular to a first tank and to a second tank. The releasable pipe allows to connect the movable tank system in a simple and fast manner to the injection machine to provide the precursor material to the injection molding apparatus for enabling manufacturing of the rotor blade.

In particular, during a manufacturing process, a first movable tank system may initially supply the precursor material until the first movable tank system is empty and may then disconnected from the injection machine. Afterwards a second movable tank system may be moved using the wheels of the second movable tank system to the manufacturing facility and may be connected to the injection machine. Then supply of the precursor material from the second movable tank system to the injection machine may be performed to enable continuing the manufacturing process of the rotor blade or enable a manufacturing process of a further rotor blade.

According to an embodiment of the present invention, the manufacturing facility further comprises the mould, wherein the mould comprises a first mould portion and a second mould portion (wherein in particular the first mould portion may be a first half of the mould and the second mould portion may be a second half of the mould, wherein the first mould portion and the second mould portion may be arranged relative to each other with corresponding recesses opposite to each other and may be connected in this relative orientation and position to each other, in particular to form a cavity into which the injection material may be supplied), which are assimilable (which may in particular be assembled, i.e. positioned and oriented in a particular manner and connected to each) for providing an inner shape (in particular limiting a cavity) complementary to an outer shape of the rotor blade when injecting the injection material into the mould and curing (or hardening or cross-linking) the injection material within the assembled first mould portion and second mould portion, and which (the first mould portion and the second mould portion) are detachable from each other for enabling releasing the cured (or hardened or cross-linked) injection material from the mould.

In particular, the mould comprising the first mould portion and the second mould portion may enable casting or forming the rotor blade by injection moulding using a single mould, thus not requiring joining several portions of the wind turbine blade which have been manufactured separately. Thereby, the stability of the rotor blade may be improved. In particular, the first mould portion may provide an inner surface which may be complementary to an outer surface of a pressure side of the rotor blade, while the second mould portion may provide an inner surface which may be complementary to an outer surface of a suction side of the rotor blade.

According to an embodiment of the present invention, the manufacturing facility further comprises at least one crane (in particular two cranes to be arranged spaced apart along a longitudinal direction of the mould, the longitudinal direction of the mould corresponding to a longitudinal direction of the rotor blade to be manufactured, wherein when the manufactured rotor blade is connected to the rotor shaft of the wind turbine the longitudinal direction of the rotor blade is perpendicular to the rotor shaft axis, wherein in particular the longitudinal direction of the rotor blade may be along the direction of maximal extent of the rotor blade) for moving (in particular translating and/or rotating or turning) the mould, in particular for moving the first mould portion and the second mould portion for assembling the first mould portion and the second mould portion with each other (in particular for positioning and/or orienting the two mould portions appropriately) and/or for disassembling the first mould portion and the second mould portion from each other (when the injection material has hardened). Thereby, the manufacturing process may be simplified.

According to an embodiment of the present invention, the movable tank system comprises a first tank (in particular comprising a first truck) for accommodating thermosetting material (a material which irreversibly cures or hardens or cross-links to form a solid material from an originally liquid material, wherein a curing process may be initiated using heat, in particular by heating up the injection material to between 150° C. and 300° C., wherein the curing or hardening may involve a chemical reaction, such as a cross-linking reaction between constituent molecules of the thermosetting material, in particular the cross-linking process may form molecules with larger molecular weight, resulting in a material with higher melting point than the original thermosetting material being void of cross-linking), in particular a thermosetting polymer (in particular a molecule composed of repeating structural units which are typically connected by covalent chemical bonds), and a second tank (in particular comprising a second truck or train) for accommodating cross-linking material (in particular a material which catalyzes or enables or allows linking one polymer chain of the thermosetting polymer to another polymer chain of the thermosetting polymer, wherein the cross-links may be covalent bonds or ionic bonds) for enabling cross-linking (in particular interconnecting molecules by a chemical reaction) of the thermosetting material after mixing the thermosetting material with the cross-linking material to form the injection material, wherein the first tank has first wheels for moving the first tank (upon rotation of the first wheels) and/or the second tank has second wheels for moving the second tank (in particular upon rotation of the second wheels).

By providing the first tank and the second tank essential ingredients, i.e. the thermosetting material and the cross-linking material, may be provided and (separately) supplied to the injection machine. In particular, it may not be required to mix the thermosetting material and the cross-linking material prior to supplying the thermosetting material and the cross-linking material to the injection machine, thereby initiating the cross-linking process only at the injection machine, thereby reducing the risk that the material hardens before it is injected into the mould.

According to an embodiment, the manufacturing facility further comprises a first supply unit (for example comprising a pump, a compressor or a reciprocating screw) adapted to supply the thermosetting material from the first tank to the injection machine. Thereby, the flow rate of the supply of the thermosetting material to the injection module may be adjusted and/or increased and the accuracy of the supply may be improved.

According to an embodiment of the present invention, the manufacturing facility further comprises a second supply unit (in particular comprising a compressor, a pump or a reciprocating screw) adapted to supply the cross-linking material from the second tank to the injection machine. Thereby, in particular the flow rate of the cross-linking material during the supply of the cross-linking material from the second tank to the injection machine may be appropriately adjusted and controlled. Thereby, the preparation of the injection material within the injection machine from the thermosetting material and the cross-linking material may be performed in a more accurate way also allowing achieving a desired flow rate for injecting the injection material into the mould.

According to an embodiment of the present invention, the manufacturing facility further comprises a de-gas system for degassing the thermosetting material and/or the cross-linking material and/or the injection material. Thereby, the gas content of the final injection material (in particular the final resin product) may be lowered to improve the quality of the manufactured rotor blade.

According to an embodiment of the present invention, the manufacturing facility further comprises a control unit (in particular comprising a processor and a storage for storing program code for controlling one or more components of the manufacturing facility) adapted and arranged (in particular interconnected) to control other components of the facility, in particular the injection machine, the first supply unit, the second supply unit, and/or the crane or the one or more cranes. Further, the control unit may control the movable tank system for e.g. controlling the flow rate of the material provided by the movable tank system. Thereby, the manufacturing process may be improved.

According to an embodiment of the present invention, the manufacturing facility further comprises an energy supply unit (in particular to be connected to a utility grid, wherein the energy supply unit may be adapted to transform the voltage provided by the utility grid to a voltage required by the components of the manufacturing facility) for supplying electric energy to other components of the facility, in particular to the injection machine, to the first supply unit, to the second supply unit, to the crane or the one or more cranes and/or to the control unit. Further, electric energy may be supplied to the movable tank system. Thereby, the manufacturing facility may be operated with the required electric energy.

According to an embodiment of the present invention, the manufacturing facility further comprises a releasable (which may be attached and detached) electrical interconnection system (in particular comprising one or more electrical cables comprising one or more electrical conductors) for releasably operatively, in particular pairwise, interconnecting components of the facility, in particular the injection machine, the first supply unit, the second supply unit, the crane or the one or more cranes, the energy supply unit and/or the control unit, with each other or at least in a pairwise manner. In particular, the releasable electrical interconnection system may electrically interconnect the components of the facility in a fast manner for setting up the manufacturing facility. Thereby, setting up the manufacturing facility may be facilitated and accelerated.

According to an embodiment of the present invention, the manufacturing facility is adapted to perform a Vacuum Assisted Resin Transfer Moulding process (VARTM) for manufacturing the rotor blade, in particular using epoxy or polyester as the thermosetting material.

In particular, the VARTM-process may comprise using a rigid mould to provide a part geometry complementary to the outer surface of the rotor blade. Further, a thin fiber layer or fiber mesh, such as a glass fiber layer or a glass fiber mesh may be placed into the mould (in particular the first mould portion and the second mould portion) and the fiber layer or fiber mesh may be covered with a thin flexible membrane, such as a foil, which may be airtight. Then, a vacuum may be applied from beneath the foil and the atmosphere pressure may compress the fiber layer or fiber mesh tightly against the rigid mould in an inner surface (in particular of the first mould portion and the second mould portion). Afterwards, the injection material may be injected between the mould surface and the thin flexible membrane (or foil), to thereby saturate or soak the fiber layer or fiber mesh with the injection material. Thereupon, heat may be applied to accelerate the cross-linking process. When the injection material has hardened or solidified the mould composed of the first mould portion and the second mould portion may be de-assembled and the completed rotor blade may be released from the mould portions.

In particular, the VARTM-process may enable manufacturing of rotor blades having a relatively thin wall but providing sufficiently high rigidity and strength.

According to an embodiment of the present invention, the components of the facility, in particular the injection machine, the first supply unit, the second supply unit, the crane or the one or more cranes and/or the control unit and/or the mould or a mould portion (in particular individually) fit into a forty-foot equivalent unit (in particular being equal to two twenty-foot equivalent units, at least in volume), in particular into a twenty-foot equivalent unit (also referred to as TEU having a size of 20 feet (6.1 m) long and 8 feet (2.4 m) wide and 1 m to 3 m high). The TEU is a standard container size which may be transported using a truck or a train in a convenient manner. Thereby, transporting to the components of the manufacturing facility to the facility site close to installation sites of the wind turbine may be facilitated. Thereby, setting up of the manufacturing facility may be simplified and may be performed in a cost-effective manner.

It should be understood that features (individually or in any combination) disclosed, described, mentioned or applied to a manufacturing facility for manufacturing a rotor blade may also be applied, provided or used for (individually or in any combination) for a method for setting up a facility or a method for manufacturing a rotor blade according to an embodiment of the present invention and vice versa.

According to an embodiment of the present invention, it is provided a method for setting up a facility at a facility site, the facility being adapted for manufacturing a rotor blade of a wind turbine, the method comprising moving an injection machine to the facility site, the injection machine being adapted for injecting an injection material into a mould to form the rotor blade; moving a movable tank system having wheels to the facility site, the movable tank system being adapted for accommodating precursor material to be supplied to the injection machine for preparing the injection material, wherein the movable tank system is moved using the wheels.

According to an embodiment of the present invention, it is provided a method for manufacturing a rotor blade of a wind turbine, the method comprising supplying, from a movable tank system having wheels, precursor material accommodated in the tank system to a injection machine for preparing injection material; and injecting, by the injection machine, the injection material into a mould to form the rotor blade.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

An embodiment of the present invention is now described with reference to the accompanying drawing. The invention is not limited to the illustrated or described embodiment.

The FIGURE schematically shows a manufacturing facility for manufacturing a rotor blade of a wind turbine according to an embodiment of the present invention.

DETAILED DESCRIPTION

The illustration in the drawing is in schematic form.

The FIGURE schematically illustrates a facility 100 for manufacturing a rotor blade 39 of a wind turbine 37 according to an embodiment of the present invention.

The facility 100 comprises an injection machine 6 for injecting an injection material mixed within the injection machine 6 via a releasable pipe 9 into a mould formed by a first mould portion 10 and a second mould portion 11. The first mould portion provides one half of the mould and the second mould portion 11 represents or provides another half of the mould which may be assembled by positioning the first mould portion 10 and the second mould portion 11 opposite to each other such that a rim 12 of an inner surface 14 of the first mould portion 10 aligns with a rim 13 of an inner surface 15 of the second mould portion 11. The FIGURE does not illustrate the assembled state of the mould formed by the mould portions 10 and 11 but illustrates when the first mould portion 10 and the second mould portion 11 are detached from each other to lay on a ground 17 which may be at least partially levelled to allow to set up the manufacturing facility 100. In the state illustrated the mould portions 10, 11, in particular the inner surfaces 14, 15, may be covered with a layer of glass fiber mesh or material and may be subsequently covered with an air tight foil. Thereupon vacuum may be applied to suck the foil close to the glass fiber and injection material may be introduced between the foil and the inner surfaces 14, 15 to soak the glass fiber material.

The inner surface 14 of the first mould portion 10 has a shape complementary to a pressure side 40 of the rotor blade 39 to be manufactured. The inner surface 15 of the second mould portion 11 has a shape complementary to a suction side 41 of the rotor blade 39 to be manufactured. The first mould portion and the second mould portion 10, 11 are movable and thus can be positioned and oriented using two cranes 2 which are spaced apart along the longitudinal direction 42 of mould portions 10, 11 which corresponds to the longitudinal direction of the rotor blade to be manufactured.

The manufacturing facility 100 further comprises a resin (e.g. vinyl ester or epoxy) supply unit 4 (also referred to as first supply unit) for accommodating and in particular supplying a thermosetting polymer from a first tank 19 to the injection machine 6.

The manufacturing facility 100 further comprises a hardener supply unit 5 (also referred to as second supply unit) for supplying a cross-linking material to the injection machine 6. The cross-linking material is delivered from a second movable tank 21 which in this particular embodiment is implemented as a second truck 21. Upon mixing the cross-linking material 23 delivered from the second truck 21 via the hardener supply unit 5 to the injection machine 6 with the thermosetting polymer 25 contained within the first truck 19 and delivered using the resin supply unit 4 to the injection machine 6 an injection material is formed within the injection machine 6. The injection material is delivered from the injection machine 6 via the pipe 9 into the mould formed by the first mould portion 10 and the second mould portion 11, when in their assembled state and a cross-linking reaction runs, in particular upon application of heat.

For controlling the injection process the injection machine 6 is controlled by an electrical supply and control unit 7 via electrical lines 8. Further, an energy supply unit 3 is comprised in the facility 100 to supply other components of the facility 100 with electric energy via cable 44.

In particular, the electrical supply and control unit 7 is coupled to a major power source (not illustrated) such as a utility grid, a diesel generator or the like. In particular, the energy supply unit 3 comprises vacuum supply pumps and compressed air compressors for supplying a vacuum and compressed air to the facility which is needed during performing the VARTM-process.

In particular, the resin supply unit 4 and the hardener supply unit 5 supply the resin components to the injection machine 6 for forming the resin used in the manufacturing process. In particular, the units 4, 5 and/or 6 may comprise one or more de-gas systems suitable for lowering the content of gas in the final resin product delivered via the pipe 9 to the mould 10, 11.

The first truck 19, in particular a container 27 containing the thermosetting polymer 25, is connected via a hose 29 to the resin supply unit 4. Similarly, the container 31 of the second truck 21 is connected via a hose 33 to the hardener supply unit 5. Thereby, the hoses 29, 33 may be flexible hoses which may harbour at their respective ends connectors which may on one end thereof be releasably connected to the containers 27, 31 of the trucks 19, 21 and on the other end to the resin supply unit 4 and the hardener supply unit 5, respectively.

The components of the manufacturing facility 100 have dimensions which enable transportation of the components using standard containers and standard transportation vehicles, such as trucks and trains. In particular, the length L of the components may be in a range between 5 m and 30 m and a width W may be in a range between 2 m and 7 m. In particular, the components 2, 3, 4, 5, 6, 7 may fit into a forty-foot equivalent unit, in particular into a twenty-foot equivalent unit (TEU). Thereby, the component of the manufacturing facility 100 may be easily transported even to very remote areas.

Further, the cranes 2 may be disassembled (as is indicated by the dashed lines 35) and may also fit into these standard containers. Further, even the mould portions 10, 11 may be constructed from several sections which may be built or assembled together, wherein each section of the mould portions 10, 11 may fit into the above-mentioned standard containers.

For setting up the manufacturing facility 100 the ground or floor 17 may be levelled at least approximately and a floor may be provided by a number of wood planks. To protect the manufacturing facility 100 some kind of housing may be erected, such as a tent building or the like.

When the components of the facility have been transported to the facility site close to the installation site of the wind turbine 37 only the interconnections 9 and 8 have to be set up in order to put the manufacturing facility 100 into an operation condition.

According to an embodiment of the present invention, two tankers or two trucks 19 may be connected or coupled to the resin supply unit 4 at the same time. Further, also two trucks or tanks 21 may be coupled to the hardener supply unit 5 at the same time. Each of the units 4, 5 may comprise a manual or an auto-switch to direct resin or hardener to be supplied from one tanker to be supplied from the second tanker such as when the first tanker is empty. Thereby, the manufacturing process may be accelerated and simplified.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

REFERENCE SIGNS 2 cranes
3 electrical supply unit
4,5 supply unit
6 injection machine
7 control unit
8 electrical lines
9 releasable pipe
10,11 mould portions
12,13 rim
14,15 inner surface
17 ground
19,21 movable tanks
23 cross linking material
25 thermosetting polymer
27,31 container
29,33 hose
37 wind turbine
39 rotor blade
40 pressure side
41 suction side
42 longitudinal direction
44 cable
100 manufacturing facility

The invention claimed is:

1. A facility for manufacturing a rotor blade of a wind turbine, the facility comprising:
   an injection machine for injecting an injection material into a mould to form the rotor blade;
   a movable tank system for accommodating precursor material to be supplied to the injection machine for preparing the injection material,
   wherein the movable tank system has wheels for moving the tank system, and
   wherein the facility is adapted to perform a Vacuum Assisted Resin Transfer Moulding process for manufacturing the rotor blade.

2. The facility according to claim 1, further comprising a releasable pipe for releasably interconnecting the tank system with the injection machine for guiding the precursor material from the tank system to the injection machine.

3. The facility according to claim 1, further comprising the mould,
   wherein the mould comprises a first mould portion and a second mould portion, which are assimilable for providing an inner shape complementary to an outer shape of the rotor blade when injecting the injection material into the mould and curing the injection material within the assembled first mould portion and second mould portion, and which are detacheable from each other for enabling releasing the cured injection material from the mould.

4. The facility according to claim 1, further comprising:
at least one crane for moving a first mould portion and a second mould portion, for assembling the first mould portion and the second mould portion with each other and for disassembling the first mould portion and the second mould portion from each other.

5. The facility according to claim 1, further comprising: at least one crane for moving a first mould portion and a second mould portion, for assembling the first mould portion and the second mould portion with each other or for disassembling the first mould portion and the second mould portion from each other.

6. The facility according to claim 5, further comprising:
a releasable electrical interconnection system for releasably operatively, in particular pairwise, interconnecting components of the facility, selected from the group consisting of the injection machine, a first supply unit, a second supply unit, the crane, a energy supply unit and a control unit.

7. The facility according to claim 5, further comprising:
a releasable electrical interconnection system for releasably operatively pairwise interconnecting components of the facility, selected from the group consisting of the injection machine, a first supply unit, a second supply unit, the crane, a energy supply unit and a control unit.

8. The facility according to claim 1, wherein the movable tank system comprises:
a first tank for accommodating thermosetting material,
a second tank for accommodating a cross-linking material for enabling cross-linking of the thermosetting material after mixing the thermosetting material with the cross-linking material to form the injection material, and
wherein the first tank has first wheels for moving the first tank and the second tank has second wheels for moving the second tank.

9. The facility according to claim 8, further comprising:
a first supply unit adapted to supply the thermosetting material from the first tank to the injection machine.

10. The facility according to claim 8, further comprising:
a second supply unit adapted to supply the cross-linking material from the second tank to the injection machine.

11. The facility according to claim 8, further comprising:
a de-gas system for degassing the thermosetting material and the cross-linking material and the injection material.

12. The facility according to claim 8, further comprising:
a de-gas system for degassing the thermosetting material or the cross-linking material or the injection material.

13. The facility according to claim 1, further comprising:
a control unit adapted and arranged to control other components of the facility selected from the group consisting of the injection machine, a first supply unit, a crane and a second supply unit.

14. The facility according to claim 1, further comprising:
an energy supply unit for supplying electric energy to other components of the facility selected from the group consisting of the injection machine, a first supply unit, a second supply unit, to a crane and to a control unit.

15. The facility according to claim 1, wherein the facility is adapted to perform a Vacuum Assisted Resin Transfer Moulding process for manufacturing the rotor blade using epoxy or polyester as the thermosetting material.

16. The facility according to claim 1, wherein components of the facility selected from the group consisting of the injection machine, a first supply unit, a second supply unit, a crane and a control unit and the mould or a mould portion, fit into a forty-foot equivalent unit.

17. The facility according to claim 16, wherein components of the facility selected from the group consisting of the injection machine, a first supply unit, a second supply unit, a crane, a control unit and a segmented mould, fit into a twenty-foot equivalent unit.

* * * * *